C. D. KARR.
BED SPRING.
APPLICATION FILED JUNE 4, 1917.
1,291,912.
Patented Jan. 21, 1919.
2 SHEETS—SHEET 1.
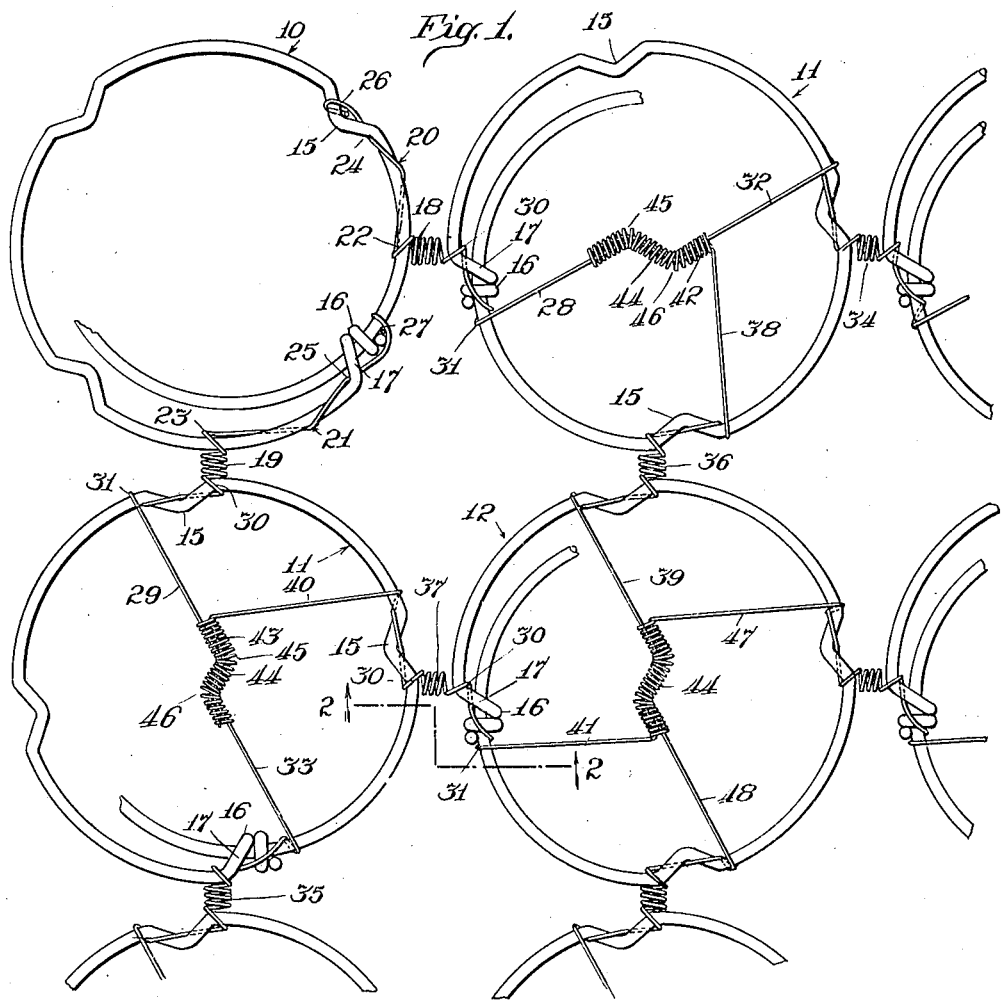
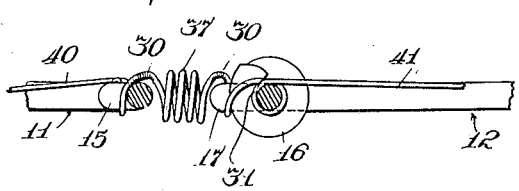
Inventor
Charles D. Karr.
By Gillson Gillson
Attorneys.

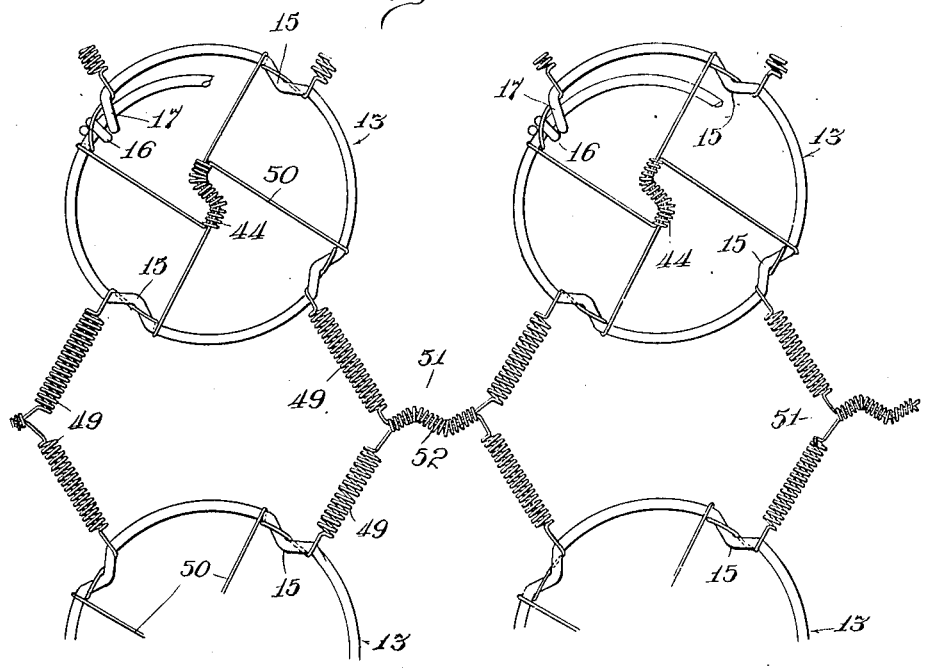
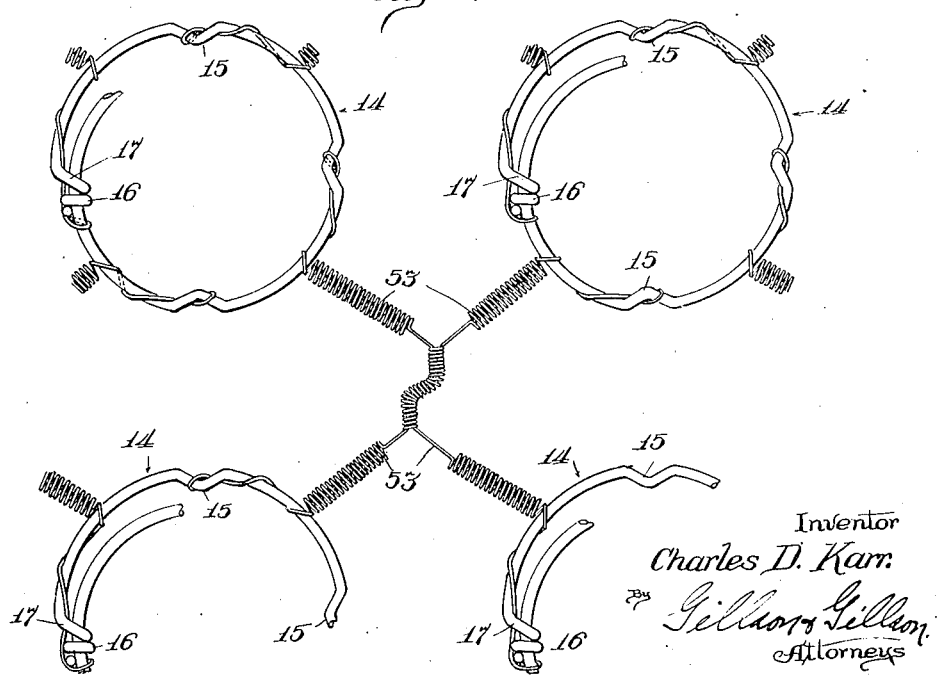

UNITED STATES PATENT OFFICE.

CHARLES D. KARR, OF HOLLAND, MICHIGAN.

BED-SPRING.

1,291,912.　　　　　　Specification of Letters Patent.　　Patented Jan. 21, 1919.

Application filed June 4, 1917. Serial No. 172,654.

*To all whom it may concern:*

Be it known that I, CHARLES D. KARR, a citizen of the United States, residing at Holland, county of Ottawa, and State of Michigan, have invented certain new and useful Improvements in Bed-Springs, of which the following is a specification and which are illustrated in the accompanying drawings, forming a part thereof.

The invention relates to bed springs of that type which is characterized by the use of a series of connected upright coil springs and has especial reference to the manner of connecting the adjacent upright coils at their upper ends. More particularly the invention contemplates the use of helical springs as the said connecting means and the object of the invention is to provide a construction in which the parts may be readily assembled while still affording such a firm anchorage for the ends of the connecting helicals upon the corresponding coil spring ends that relative movement between the helicals and the coil spring ends, at the points of connection, is wholly prevented. A further object of the invention is to provide a form of construction in which the ends of the wire of the connecting helicals are effectively concealed and protected.

In the accompanying drawings;

Figure 1 is a detail plan view of a bed spring showing the upper or surface turns of a plurality of the upright coils adjacent one corner of the bed spring and the manner in which these parts may be connected in carrying out the invention, Fig. 2 is a detail sectional view taken on the line 2—2 of Fig. 1, Fig. 3 is similar to Fig. 1 but shows a portion of the bed spring remote from its margins and a modified form of construction, and Fig. 4 is similar to Fig. 3 but shows another modification.

Some of the surface turns of the upright coils of a bed spring are shown at 10, 11 and 12 (Fig. 1), at 13 (Fig. 3) and at 14 (Fig. 4). In Fig. 1 the surface turn 10 is at the corner of the bed spring while the surface turns 11 are at the margins of the spring adjacent the said corner. When the adjacent surface turns of the bed spring are to be connected in the manner provided by the invention, each of the said turns is preferably formed with a series of equidistant V-shaped dents 15 comprising inward deflections of the spring material in a horizontal plane. As each surface turn 10, 11, 12, 13 or 14, will usually be formed with a knot, as 16, at one side, the series of V-shaped dents 15 may extend only part way around the turn and be spaced from the knot 16 at distances equal to the spacing of the dents 15. Under these circumstances, the spring material is preferably inwardly deflected adjacent the knot 16, as at 17, forming an offset portion similar to a side of any one of the dents 15.

As the surface turns 10, 11, and 12, or 13 and 14 are arranged in parallel rows, each of said turns is provided with three of the said V-shaped dents 15. In the forms of construction illustrated in Figs. 1 and 4, the V-shaped dents 15 and the knot 17 of the surface turn of each of the upright coils, except the one at the corner of the spring, are located adjacent the axis of the corresponding row. The V-shaped dents 15 and the knot 16 of the surface turn 10 (Fig. 1) and of each of the surface turns 13 (Fig. 3) are located intermediate the axes of the corresponding rows in the two directions.

The helical springs for connecting the surface turns 10 (Fig. 1) with the two adjacent surface turns 11 are represented at 18 and 19. Each of these helical springs has a laterally extended end 20 or 21. In making the connection with the surface turn 10, the terminal coil 22 or 23 of each helical spring 18, 19, is hooked over the adjacent side of the surface turn 10. The extended end 20 or 21 is then wrapped about the side of the turn 10 in a long irregular bend extending to one of the V-shaped dents 15 or to the knot 16. The extended spring ends 20 and 21 accordingly pass under the adjacent side of the V-shaped dent 15, as at 24, or under the inwardly deflected part 17, adjacent the knot 16, as at 25. The helical springs 18, 19, are found to be more firmly anchored upon the surface turn 10, if their extended ends 20, 21, are wrapped about the side of the turn 10 in the long irregular bends already mentioned, the same consisting of a series of relatively abrupt bends, as distinguished from a continuous smooth spiral curve.

The connection of the helical springs 18, 19 with the surface turn 10, is completed by wrapping the extended spring ends 20, 21, in close coils about the side of the surface turn 10, immediately beyond the adjacent side of the V-shaped dent 15, or beyond the knot 16, as at 26 or 27. As the two spring ends 20, 21, may be simultaneously manipulated in the two hands of an operator the invention provides a construction which may be rapidly assembled. Furthermore, a firm anchorage for the ends of the connecting helical springs, as 18 and 19, is obtained without the use of additional parts. This firm anchorage for the ends of the connecting helical springs insures that all of the relative movement between the surface turn 10 and the turns 11 of the adjacent upright coils, will be accommodated by the flexing of the connecting helical springs 18 and 19 between their ends. Any rubbing together of the parts in use is thereby prevented, notwithstanding the simplicity of the construction.

The helical springs 18 and 19 (Fig. 1) also have extended ends indicated at 28 and 29 respectively. The terminal coil 30 of each of these helical springs has hooked engagement with the side of one of the rings 11 immediately adjacent the corresponding offset 17 or one of the V-shaped dents 15. Under these circumstances, the corresponding extension 28 or 29 is passed under the offset 17 or under the adjacent side of the V-shaped dent 15. The said extension is then passed over the knot 16 or over the far side of the V-shaped dent 15 and is then wrapped around the side of the ring 11, as at 31. From this point, the extension 28 or 29 passes horizontally over the opening of the ring 11 and overlaps a similar extension 32 or 33 which comes from the opposite side of the ring.

The extensions 32 and 33 are the extended ends of helical springs 34 and 35 respectively. These helical springs are used for connecting the rings 11 with other rings in the same row. They are connected with the rings 11 and with the said other rings, in the manner employed for connecting the helical springs 18 and 19 with the rings 11. A similar helical spring 36 or 37 serves for connecting each ring 11 with the adjacent side of the ring 12. The two ends of the helical springs 36 and 37 are connected with the rings 11 and 12 in the same manner that one end of each of the helical springs 18 and 19 is connected with the corresponding ring 11.

The helical springs 36 and 37 also have extended ends 38, 39, and 40, 41. The extensions 38 and 40 pass over the opening of the corresponding ring 11, to about the mid-width of the said ring, where they are turned at right angles to provide a portion 42 or 43 which extends parallel with the overlapped portion of the extensions 28, 32 or 29, 33. The construction is completed by the use of a tube, as 44, for inclosing the overlapped portions of the extensions 28, 32 or 29, 33 and the adjacent part, 42 or 43, of the extension 38 or 40. If desired, each of the tubes 44 may take the form of a closely coiled wire. In order that this may not become displaced, with respect to the inclosed parts, it is preferably bent at intervals, in a horizontal plane, as at 45 and 46.

It will be understood that the arrangement illustrated in Fig. 1 provides a construction in which the surface turns of all of the upright springs, except the surface turns as 10, of the springs at the corners of the bed, are bridged over by a net-work of helical spring extensions, as 28, 32, 38 or 29, 33, 40. It will also be understood that the ends of these helical spring extensions are effectively held within and concealed by the tubular inclosures 44. While the surface turns, as 11, in the margins of the bed, are bridged over with the extensions from only three helical springs, as 18, 34, and 36 or 19, 35, and 37, the surface turns, as 12, of the upright coils in the intermediate part of the bed are bridged over with helical spring extensions, as 39 and 41, which enter the opening of the corresponding surface turn from four different directions. In each of these last mentioned instances, two of the helical spring extensions, as 41 and 47, have their end portions turned at right angles to enter the bore of the corresponding tube 44 with the overlapped portions of the two helical spring extensions, as 39 and 48.

In the form of construction illustrated in Fig. 3 connecting helical springs, as 49, are each secured at one end to one of the surface turns 13 in the manner shown in Fig. 1 for connecting the ends of the helical springs 34, 35, 36, 37 with the surface turns 11 and 12. The opening of each surface turn 13 is accordingly bridged over with a plurality of helical spring extensions, as 50, in like manner with the surface turn 12 (Fig. 1). In Fig. 3, the connecting helical springs, as 49, do not extend directly between the two adjacent surface turns 13, but one end of each helical spring, as 49, is connected with the ends of similar helical springs which lead from the three adjacent surface turns 13. For this purpose each helical spring, as 49, has an extended end 51 and the extended ends 51 of each set of four adjacent helical springs, as 49, are inclosed within a tube 52, like that illustrated at 44 in Fig. 1.

In the form of construction illustrated in Fig. 4, one end of each of the connecting helical springs, as 53, is secured to the adjacent surface turn 14 in the same manner that the helical springs 18 and 19 are connected with the surface turn 10 (Fig. 1). The other ends of the connecting helical springs, as 53, (Fig. 4) are united in the same manner as are the corresponding ends of the connecting helical springs as 49. (Fig. 3). In each of the forms of construction illustrated in Figs. 3 and 4 the connecting helical springs 49 or 53 constitute a grid upon the surface of the bed spring between the surface turns, as 13 or 14, of adjacent upright coil springs. In all cases, the ends of wire used in the connecting helical springs are effectively concealed and protected and all of the relative movement between the surface turns of adjacent upright coils is accommodated by a flexing of the connecting helical springs. There are accordingly no sharp projecting points and there is no frictional movement between connected parts.

I claim as my invention:

1. In a bed spring, in combination, a plurality of horizontal rings being the upper ends of a series of upright coil springs, each of the said rings having a series of equally spaced offsets in its own plane and relatively long uninterrupted portions between the said offsets, and helical springs having oppositely directed laterally extending ends uniting the rings, the terminal coils of each of the said helical springs having downward hooked engagement with uninterrupted portions of the adjacent rings at points remote from their respective offsets and each extended end of each helical spring being wrapped in complete turns about the side of the corresponding ring both between the point of engagement of the corresponding helical spring with the ring and one of the offsets of the ring and beyond the last mentioned offset from the said point of engagement of the helical spring with the ring, the first of the said complete turns of each of the extended helical spring ends being outwardly under and thence inwardly over the side of the corresponding ring and the last of the said complete turns of each of the extended helical spring ends being inwardly over and thence outwardly under the side of the corresponding ring, the tip of each extended helical spring end facing upwardly and being located immediately adjacent the remote side of the corresponding ring offset from the said point of engagement of the helical spring with the ring.

2. In a bed spring, in combination, a plurality of horizontal rings being the upper ends of a series of upright coil springs, a plurality of helical springs each having one end connected to one of the rings and extending outwardly therefrom, the other end of each helical spring being extended and overlapped with the corresponding extension of another helical spring extending from a different ring and a tube inclosing the said overlapped portions of the helical spring extensions.

CHARLES D. KARR.